(12) United States Patent
Withers et al.

(10) Patent No.: US 9,249,520 B2
(45) Date of Patent: Feb. 2, 2016

(54) THERMAL AND ELECTROCHEMICAL PROCESS FOR METAL PRODUCTION

(75) Inventors: James C. Withers, Tucson, AZ (US); Raouf O. Loutfy, Tucson, AZ (US)

(73) Assignee: MATERIALS & ELECTROCHEMICAL RESEARCH CORP., Tucson, AZ (US)

( * ) Notice: Subject to any disclaimer, the term of this patent is extended or adjusted under 35 U.S.C. 154(b) by 1825 days.

(21) Appl. No.: 11/427,984

(22) Filed: Jun. 30, 2006

(65) Prior Publication Data

US 2006/0236811 A1    Oct. 26, 2006

Related U.S. Application Data

(62) Division of application No. 10/828,641, filed on Apr. 21, 2004, now Pat. No. 7,410,562.

(60) Provisional application No. 60/496,981, filed on Aug. 20, 2003.

(51) Int. Cl.
| | |
|---|---|
| *C25C 3/34* | (2006.01) |
| *C25C 3/32* | (2006.01) |
| *C22B 34/12* | (2006.01) |
| *C25C 3/26* | (2006.01) |
| *C25C 3/28* | (2006.01) |
| *C25C 3/36* | (2006.01) |
| *C25C 5/04* | (2006.01) |

(52) U.S. Cl.
CPC ............... *C25C 3/32* (2013.01); *C22B 34/129* (2013.01); *C22B 34/1281* (2013.01); *C22B 34/1295* (2013.01); *C25C 3/26* (2013.01); *C25C 3/28* (2013.01); *C25C 3/34* (2013.01); *C25C 3/36* (2013.01); *C25C 5/04* (2013.01)

(58) Field of Classification Search
USPC .......................................................... 205/366
See application file for complete search history.

(56) References Cited

U.S. PATENT DOCUMENTS

| | | | |
|---|---|---|---|
| 2,302,604 A | 11/1942 | Dolbear | |
| 2,681,847 A | 6/1954 | Wainer et al. | .................... 23/202 |
| 2,681,848 A | 6/1954 | Wainer et al. | .................... 23/202 |
| 2,681,849 A | 6/1954 | Sibert et al. | .................... 23/202 |
| 2,698,221 A | 12/1954 | Wainer et al. | .................... 23/202 |
| 2,707,168 A | 4/1955 | Wainer et al. | |
| 2,722,509 A * | 11/1955 | Wainer | ........................... 205/401 |
| 2,733,133 A | 1/1956 | Cave et al. | ....................... 23/202 |

(Continued)

FOREIGN PATENT DOCUMENTS

| | | | | |
|---|---|---|---|---|
| CA | 626363 | 8/1961 | | |
| CN | 1376813 | 10/2002 | ............... | C25C 3/36 |

(Continued)

OTHER PUBLICATIONS

Hashimoto, "Sintered Titanium Carbide as the Soluble Anode for Fused-Salt Electrolysis", Dep. Mater. Sci., Himeji Inst. Technol., Himeji, Japan, Journal written in Japanese, 1971, pp. 487-493, Abstract only.

(Continued)

*Primary Examiner* — Arun S Phasge
(74) *Attorney, Agent, or Firm* — Brinks Gilson & Lione (57) ABSTRACT

A system for purification of high value metals comprises an electrolytic cell in which an anode formed of a composite of a metal oxide of the metal of interest with carbon is electrochemically reduced in a molten salt electrolyte.

21 Claims, 4 Drawing Sheets

(56) References Cited

U.S. PATENT DOCUMENTS

| | | | |
|---|---|---|---|
| 2,743,166 A | 4/1956 | Wainer et al. | 23/202 |
| 2,750,259 A | 6/1956 | Steinberg et al. | 23/202 |
| 2,792,310 A | 5/1957 | Steinberg et al. | 106/43 |
| 2,798,844 A | 7/1957 | Freedman | 204/64 |
| 2,828,251 A | 3/1958 | Sibert et al. | 204/39 |
| 2,831,802 A | 4/1958 | Raney | 204/10 |
| 2,833,704 A | 5/1958 | Wainer | 204/64 |
| 2,848,303 A | 8/1958 | Copper | 23/202 |
| 2,868,703 A | 1/1959 | Wainer | |
| 2,880,149 A | 3/1959 | Carlton et al. | 204/64 |
| 2,904,426 A | 9/1959 | Wainer | 75/10 |
| 2,904,428 A | 9/1959 | Dean | 75/614 |
| 2,909,473 A | 10/1959 | Dean et al. | 205/399 |
| 2,913,379 A | 11/1959 | Steinberg | 204/64 |
| 2,939,823 A | 6/1960 | Rand | 205/400 |
| 2,994,650 A * | 8/1961 | Slatin | 205/47 |
| 3,047,477 A | 7/1962 | Spraul et al. | |
| 3,078,149 A | 2/1963 | Barber | 23/202 |
| 3,083,153 A | 3/1963 | Wagner | 204/246 |
| 3,098,805 A | 7/1963 | Ervin et al. | |
| 3,137,641 A | 6/1964 | Slatin | 205/398 |
| 3,794,482 A | 2/1974 | Anderson et al. | 75/84.1 |
| 3,825,415 A | 7/1974 | Johnston et al. | 75/84.5 |
| 3,850,615 A | 11/1974 | Reeves | 75/435 |
| 3,853,536 A | 12/1974 | Tylko | 75/3 |
| 3,915,837 A | 10/1975 | Feige, Jr. | 204/290.12 |
| 3,941,583 A | 3/1976 | Martin et al. | 75/4 |
| 3,989,511 A | 11/1976 | Fey et al. | 75/0.5 |
| 4,080,194 A | 3/1978 | Fey | 75/10 |
| 4,107,445 A | 8/1978 | Wolf et al. | 13/2 |
| 4,127,409 A | 11/1978 | Megy | 75/84.4 |
| 4,338,177 A | 7/1982 | Withers et al. | 204/243 |
| 4,342,637 A | 8/1982 | Withers et al. | 204/282 |
| 4,373,947 A | 2/1983 | Buttner et al. | 75/0.5 |
| 4,409,083 A | 10/1983 | Upperman et al. | 204/245 |
| 4,431,503 A | 2/1984 | Withers et al. | 204/294 |
| 4,521,281 A * | 6/1985 | Kadija | 205/398 |
| 4,668,501 A | 5/1987 | Shibuta et al. | 423/608 |
| 4,670,110 A | 6/1987 | Withers et al. | 204/67 |
| 4,851,089 A | 7/1989 | Honders et al. | 205/363 |
| 4,931,213 A | 6/1990 | Cass | 252/507 |
| 5,215,631 A | 6/1993 | Westfall | 205/351 |
| 5,224,534 A | 7/1993 | Shimizu et al. | 164/469 |
| 5,328,501 A | 7/1994 | McCormick et al. | 75/352 |
| 5,340,447 A | 8/1994 | Bertaud et al. | 205/47 |
| 5,679,131 A | 10/1997 | Obushenko | 75/435 |
| 5,772,724 A | 6/1998 | Inoue et al. | 75/10.13 |
| 6,074,545 A | 6/2000 | Ginatta | 205/363 |
| 6,231,636 B1 | 5/2001 | Froes et al. | 75/352 |
| 7,410,562 B2 * | 8/2008 | Withers et al. | 205/367 |
| 7,504,017 B2 * | 3/2009 | Cardarelli | 205/398 |
| 2002/0139667 A1 | 10/2002 | Wang | 204/298.13 |
| 2003/0057101 A1 | 3/2003 | Ward Close et al. | 205/363 |
| 2003/0061909 A1 | 4/2003 | Negami et al. | 75/485 |
| 2004/0194574 A1 | 10/2004 | Cardarelli | 75/10.26 |
| 2005/0034561 A1 | 2/2005 | Liebaert | 75/351 |
| 2005/0166706 A1 | 8/2005 | Withers et al. | 75/10.23 |

FOREIGN PATENT DOCUMENTS

| | | | | |
|---|---|---|---|---|
| CN | 1376813 A | 10/2002 | | C25C 3/36 |
| CN | 1712571 | 12/2005 | | C25C 3/28 |
| FR | 1.167.261 | 11/1958 | | |
| GB | 251527 | 5/1926 | | |
| GB | 251527 | 6/1926 | | |
| GB | 452269 | 7/1936 | | C25C 7/02 |
| GB | 635267 | 4/1950 | | |
| GB | 825872 | 12/1959 | | |
| JP | 30-7554 | 10/1930 | | |
| JP | 43-8334 | 3/1943 | | |
| JP | 43-19739 | 8/1943 | | |
| JP | 45-25561 | 8/1970 | | |
| JP | 61-031302 | 2/1986 | | C01B 6/00 |
| JP | 01-096390 | 4/1989 | | C25C 3/32 |
| JP | 2000-080491 | 3/2000 | | C25C 3/34 |
| WO | WO 99/64638 | 12/1999 | | |
| WO | WO 03/002785 | 1/2003 | | C25C 3/28 |
| WO | WO 03/046258 | 5/2003 | | C25C 3/28 |

OTHER PUBLICATIONS

Hasimoto, "Extraction of titanium from soluble anodes of arc-reduced titanium—carbon—oxygen and titanium carbide",Dep. Mater. Sci., Himeji Inst. Technol., Journal written in Japanese, 1971, pp. 282-288, Abstract only.

Hashimoto, "Anodic extraction of titanium from low-grade (δ)-titanium—carbon—oxygen alloy by fused-salt electrolysis", Dep. MaterSci. Himeji Inst. Technol., Himeji, Japan, Journal writtenin Japanese, 1971, pp. 480-486, Abstractonly.

Hashimoto, "Electrodeposition of pure titanium metal by double-stage fused-salt electrolysis", Dep. Mater. Sci. Himeji Inst. Technol., Himeji, Japan, Journal written in Japanese, 1968, pp. 108-119, Abstract only.

Hashimoto, "Electrowinning of titanium from its oxides. III. Electrowinning of titanium from titanium dioxide or calcium titanate in calcium fluoride-magnesium fluoride molten bath salts", Dep. Mater. Sci., Himeji Inst. Technol., Himeji, Japan, 1972, pp. 39-44, Journal written in Japanese, Abstract only.

Official Action received in U.S. Appl. No. 11/536,599.

Australian Official Action, dated Apr. 14, 2009, (3 pgs).

Office Action received in corresponding divisional U.S. Appl. No. 11/536,599.

ASM International, Materials Park, Ohio, Powder Metal Technologies and Applications, vol. 7, "Production Sintering Practices", pp. 499-501. 1998.

Ananth et al., "Single Step Electrolytic Production of Titanium", Trans. Indian Inst. Met., vol. 51, No. 5, Oct. 1998, pp. 339-403.

Kiparisov et al., "Obtaining of Titanium Powder by Ore Concentrates Treatment", Science of Sintering, vol. 17, No. 3, Sep. 1985, pp. 139-144.

Hashimoto, Yasuhiko, "Studies of Electrowinning of Titanium from Titanium Oxides in CaF3—MgF2 Molten Salt Baths", Hashimoto Journal, 40, No. 1, 1972, pp. 1-13.

Jiao et al., "Titanium electrolysis using TiCxOy anode prepared through carbothermic reduction of titanium dioxide", School of Metallurgical and Ecological Engineering, University of Science and Technology Beijing, pp. 867-869.

Office Action received in corresponding US Continuation in Part U.S. Appl. No. 11/294,872.

JP Official Action + Translation, dated Apr. 16, 2010 JP Patent Appln. No. 2006-523976 (7 pgs).

Yasuhiko Ito, Toshiyuki Nohira, "Non-conventional electrolytes for electrochemical applications", Electrochimica Acta, Elsevier Science Publishers, Barking, GB, vol. 45, No. 15-16, May 2000, pp. 2612-2622.

A. Robin and R.B. Ribeiro, "Pulse electrodeposition oft itanium on carbon steel in the LiF—NaF—KF eutectic melt", J. Applied Electrochemistry, vol. 30, 2000, pp. 239-246.

"Direct Electorchemical Reduction of Titanium Dioxide to Titanium in Molten Calcium Chloride" Chen et al., *Letters to Nature*, vol. 407, 2000, pp. 361-364.

"The Fusion Electrolysisi of Titanium, Sixth Castner Memorial Lecture" Kroll, *Chemistry and Idustry*, 1960, pp. 1314-1322.

"The Production of Ductile Titanium" Kroll, Paper presented and the Seventy-Eighth General Meeting, 1940, pp. 35-47.

"Metallic Titanium" Hunter, *General, Physical and Inorganic*, pp. 330-338.

"Why Produce Titanium by EW?" Ginatta, *Industrial Insight*, 2000, pp. 18-20.

"Some Obsrvations on the Kroll Process for Titanium" Wartman et al., *Journal of the Electrochemical Society*, 1954, pp. 507-513.

"Sodium Reduction of Titanic Chloride" Homme et al., *Report of Investigations 5398*,1958, pp. 1-29.

"Mechanism of Sodium Reduction of Titanium Chloride in Fused Salts" Henri et al., *Report of Investigations 5661*, pp. 1-37.

U.S. Official Action, dated Jul. 20, 2009 for U.S. Appl. No. 11/294,872.

(56) References Cited

OTHER PUBLICATIONS

South Korean Official Action + Translation dated Jun. 16, 2011 in Korean Patent Appln. No. 10-20067003276 (6 pgs).
Chinese Official Action translation only issued Jul. 14, 2011, in Chinese Appln. Serial No. 200680036021.2 (7 pgs).
Official Action from European Patent Application Serial No. 11001400.8-2119, dated Apr. 14, 2011.
Official Action from European Patent Application Serial No. 04781369.6-2119, dated Feb. 1, 2011.
Japanese Official Action + Translation dated Aug. 6, 2010 (JP Patent Appln. No. 2006-523976) (4 pgs).
U.S. Office Action, U.S. Appl. No. 11/536,599, dated Nov. 12, 2010 (13 pages).
South Korean Official Action dated Jun. 16, 2011 in Korean Patent Appln. Serial No. 10-2006-7003276.
Official Action dated Jul. 12, 2011 in co-pending U.S. Appl. No. 12/016,859.
Official Action (dated Dec. 10, 2010) issued in corresponding Canadian Appln. 2,535,978 (2 pgs).

\* cited by examiner

COMPOSITE ANODE PROCESS

THERMAL AND ELECTROCHEMICAL PROCESS FOR METAL PRODUCTION

CROSS REFERENCE TO RELATED APPLICATIONS

This is a divisional of our U.S. application Ser. No. 10/828,641, now issued U.S. Pat. No. 7,410,562, filed Apr. 21, 2004. This application claims the benefit of U.S. Provisional Application Ser. No. 60/496,981, filed Aug. 20, 2003.

STATEMENT REGARDING FEDERALLY SPONSORED RESEARCH DEVELOPMENT

This invention was made with Government support under contract numbers W911QX-04-0009 awarded by the U.S. Army and MDA972-03-C-0034 awarded by the Defense Advanced Research Projects Agency. The Government may have certain rights in the invention.

FIELD OF THE INVENTION

The present invention relates to the production of metals. The invention has particular utility in connection with the production of titanium and will be described in connection with such utility, although other utilities are contemplated, e.g., production of other high value multi-valence and high (2 or more) valence metals, in particular refractory metals such as chromium, hafnium, molybdenum, niobium, tantalum, tungsten, vanadium and zirconium which are given as exemplary.

BACKGROUND OF THE INVENTION

The properties of titanium have long been recognized as a light, strong, and corrosion resistant metal, which has lead to many different approaches over the past few decades to extract titanium from its ore. These methods were summarized by Henrie [1]. Despite the many methods investigated to produce titanium, the only methods currently utilized commercially are the Kroll and Hunter processes [2, 3]. These processes utilize titanium tetrachloride ($TiCl_4$) which is produced from the carbo-chlorination of a refined titanium dioxide ($TiO_2$) according to the reaction:

$TiO_2(s)+2Cl_2(g)+2C(s) \rightarrow TiCl_4(g)+2CO(g)$.

In the Kroll process [2] $TiCl_4$ is reduced with molten magnesium at $\approx 800°$ C. in an atmosphere of argon. This produces metallic titanium as a spongy mass according to the reaction:

$2Mg(l)+TiCl_4(g) \rightarrow Ti(s)+2MgCl_2(l)$ from which the excess Mg and $MgCl_2$ is removed by volatilization, under vacuum at $\approx 1000°$ C. The $MgCl_2$ is then separated and recycled electrolytically to produce Mg as the reductant to further reduce the $TiCl_4$. In the Hunter process [3,4] sodium is used as a reductant according to the reaction:

$4Na(l)+TiCl_4(g) \rightarrow Ti(s)+4NaCl(l)$

The titanium produced by either the Kroll or Hunter processes must not only be separated from the reductant halide by vacuum distillation and/or leaching in acidified solution to free the titanium sponge for further processing to useful titanium forms, but also require the recycling of the reductant by electrolysis. Because of these multiple steps the resultant titanium is quite expensive which limits its use to cost insensitive applications.

The US Bureau of Mines performed extensive additional investigations [1,5-8] to improve the Kroll and Hunter processes. Many other processes have been investigated that include plasma techniques [9-13], molten chloride salt electrolytic processes [14], molten fluoride methods [15], the Goldschmidt approach [16], and alkali metal-calcium techniques [17]. Other processes investigated without measurable success have included aluminum, magnesium, carbothermic and carbo-nitrothermic reduction of $TiO_2$ and plasma reduction of $TiCl_4$ [18]. Direct reduction of $TiO_2$ or $TiCl_4$ using mechanochemical processing of ball milling with appropriate reductants of Mg or calcium hydride ($CaH_2$) also have been investigated [19] without measurable success. Kroll, who is considered as the father of the titanium industry [20] predicted that titanium will be made competitively by fusion electrolysis but to date, this has not been realized.

An electrolytic process has been reported [21] that utilizes $TiO_2$ as a cathode and carbon or graphite as the anode in a calcium chloride electrolyte operated at 900° C. By this process, calcium is deposited on the $TiO_2$ cathode, which reduces the $TiO_2$ to titanium and calcium oxide. However, this process is limited by diffusion of calcium into the $TiO_2$ cathode and the build-up of calcium oxide in the cell, which limits operating time to remove the calcium oxide or replacement of the electrolyte. Also the $TiO_2$ cathode is not fully reduced which leaves contamination of $TiO_2$ or reduced oxides such as TiO, mixed oxides such as calcium titanante as well as titanium carbide being formed on the surface of the cathode thus also contaminating the titanium. Thus, current $TiO_2$ cathode electrolytic processes are no more commercially viable than earlier electrolytic processes.

SUMMARY OF THE INVENTION

The instant invention is a combination of a thermal and an electrochemical process, which utilizes a carbon or composite anode containing a metal oxide of a metal of interest, as a feed electrode. As used herein the term "carbon" is meant to include carbon in any of its several crystalline forms including, for example, graphite. For example, for producing purified titanium, the feed should comprise $TiO_2$ which may be high purity, rutile, synthetic rutile, illuminate or other source of titanium, mixed with a source of carbon and pressed together with or without a binder that also may be a source of carbon on pyrolysis to form a $TiO_2$—C composite green electrode or billet. The $TiO_2$—C composite billet is then heated, in the absence of air to avoid oxidation of the carbon component, to a temperature sufficient to reduce the plus four valence of the titanium in the $TiO_2$ to a lower valence. The temperature of heating and time at temperature will determine the reduced oxide stoichiometry of the titanium oxide which may be expressed as $Ti_xO_y$, where the ratio of y/x can be 0 to equal or less than 2 and y balances the valence charge of the titanium species. Some examples of reduced titanium oxide compounds include TiO, $Ti_2O_3$, $Ti_3O_5$, and $Ti_4O_7$ and mixtures thereof. Sufficient residual carbon needs to remain after the thermal reduction step or can be added separately to stoichiometrically react with the reduced titanium oxide to electrochemically produce titanium at the cathode and $CO_2$ and/or CO at the anode. The reduced titanium state oxide composite anode overall general reactions are:

$$Ti_xO_y + \left(\frac{y+n}{z}\right) C = xTi + nCO + \left(\frac{y-n}{z}\right)CO_2$$

at the anode:

$$Ti_xO_y + \left(\frac{y+n}{z}\right) C = xTi^{+2y/x} + nCO + \left(\frac{y-n}{2}\right)CO_2 + zye^-$$

where 2y/x is the oxide state of the titanium in the electrolyte,
at the cathode:
$xTi+^{+2y/x}+zye^-=xTi$

BRIEF DESCRIPTION OF THE DRAWINGS

Further features and advantages of the present invention will be seen by the following detailed description, taken in conjunction with the accompanying drawings wherein.

DETAILED DESCRIPTION OF THE INVENTION

The present invention employs a novel electrochemical system for producing titanium and other metals by a combination of thermal and electrochemical processes from a novel metal oxide-carbon composite anode. More particularly, the present invention produces purified titanium or other metal powders by a thermal/electroduction composite anode process using a metal oxide-carbon anode in a molten salt electrolyte.

Heretofore the electrolysis of titanium oxide ($TiO_2$) has not been successful because $TiO_2$ has little to no solubility in molten salt electrolytes which is also true of other titanium compounds. Titanium tetrachloride ($TiCl_4$) is a covalent compound that has limited solubility in fused salts and does not readily form complexes with other inorganic salts. It also is highly volatile and is quickly lost from most fused salts. However, since titanium is multivalent, it has been shown that $TiCl_4$ could be reduced to lower valent ionic species of $Ti^{+3}$ and $Ti^{+2}$, which do exhibit some solubility in some molten salts. However, because of secondary reversibility reactions, which lead to loss in current efficiency and poor quality of metal, heretofore no practical process has evolved for electrowinning titanium from a $TiCl_4$ feed. Investigations of separating the anolyte and catholyte to avoid alternating oxidation and reduction with low current efficiency have not proven successful on a commercial scale.

Since titanium +3 (corresponding to y/x of 1.5) and titanium +2 (corresponding to y/x of 1.0) are ionic species, it should be possible to deposit titanium at the cathode, i.e. according to the reactions:

$Ti^{+3}+3e=Ti^0$ or $Ti^{+3}+e=Ti^{+2}$ and $Ti^{+2}+2e=Ti^0$ from a molten salt electrolyte. However, such reactions have not been demonstrated commercially since heretofor there has not been demonstrated an acceptable process to continuously supply $Ti^{+2y/x}$ or lower valence ions where y/x is less than 2 to a molten salt electrolyte. The present invention in one aspect provides a metal oxide/carbon composite anode containing $Ti_xO_y$ in which a high valence metal such as $Ti^{+4}$, is thermally reduced to a valence less than +4, and is used to provide a continuous supply of reduced titanium ions to a molten salt electrolyte. The oxygen combines with the carbon in the anode to produce $CO_2$ and/or CO gas. Any excess carbon in the anode floats to the top of the molten salt electrolyte where it periodically can be skinned if necessary and does not interfere with the continuous electrolysis process.

It is well established that thermal reduction is much more economical than electrochemical reduction. Therefore reducing $TiO_2$ thermally is more economical than electrolytically reducing in a composite anode of $TiO_2$-carbon. If $TiO_2$ is heated with carbon, carbo-thermic reduction will proceed based on the thermodynamic prediction and kinetics of the reactants. For example it has been found when the proper proportions of $TiO_2$ and carbon are heated to various temperatures, reduced oxides are produced. An example reaction is $2TiO_2+C=Ti_2O_3+CO$. The $Ti_2O_3$ in which the titanium is in a +3 valence state can be produced over the temperature range of 1250-1700° C. Since the product is a solid $Ti_2O_3$ and gaseous CO if the pressure is reduced the kinetics of the reactions is enhanced.

It is also possible to produce the suboxide TiO according to the reactions $TiO_2+C=TiO+CO$ or $Ti_2O_3+C=2TiO+CO$. Either reaction will be enhanced at reduced pressure. Titanium in TiO is in the +2 valence state. A competing reaction is $TiO_2+3C=TiC+2CO$ or $Ti_2O_3+5C=2TiC+3CO$. When the suboxide is used as a feed for the composite anode, the lowest valence is the most desirable. Thus it is desirable to prevent TiC forming in which the titanium is in a +4 state. It has been found that TiO can be produced at a reaction temperature above 1700° C. if the pressure is reduced to 0.01 atmosphere or lower. If the pressure is as high as 0.1 atmosphere a reaction temperature above 1800° C. is required to produce TiO free of TiC. At atmospheric pressure a reaction temperature above 2000° C. is required to produce TiO free of TiC.

In addition to producing titanium from a composite anode consisting of a reduced titanium oxide and a carbon source referred to as a composite anode it is also possible to electrowin titanium from other titanium compounds that are not oxides. These compounds include titanium nitride (TiN). Titanium nitride is a conductor and does not require any conductive phase such as carbon with titanium suboxides. TiN can be produced by reacting $TiO_2+2C+N=TiN+2CO$. The TiN is pressed and sintered in a nitrogen atmosphere to produce a solid of TiN. The TiN can then be utilized as an anode in a fused salt to electrowin/deposit titanium at the cathode and nitrogen gas will be evolved at the anode.

Another compound is titanium carbide (TiC). Titanium carbide is produced by the reaction of $TiO_2+2C=TiC+2CO$. The TiC is a conductor and when TiC particles are pressed and sintered to a solid, the solid can serve as an anode. When using TiC as the anode a separator or diaphragm should separate the cathode and anode compartments. Titanium ions will be electrolytically dissolved from the anode and reduced to titanium metal at the cathode. The released carbon will be in solid form and must be accounted for in an overall materials balance. To account for the carbon the anode can be depolarized with oxygen wherein the oxygen will react with the carbon to form gaseous $CO_2$ and/or CO. Thus oxygen gas would be passed over the anode to react with the carbon, but since titanium is so sensitive to oxygen the cathode should be separated from the anode with a diaphragm to prevent the oxygen from contacting the deposited titanium.

It is taught in WO09964638, U.S. Pat. No. 6,663,763B2, WO 02/066711 A1, WO 02/083993 A1 and WO03/002 785 A1, that $TiO_2$ can serve as a cathode in a calcium chloride fused salt wherein the $TiO_2$ is reduced to titanium metal with oxygen given off at the anode using an inert anode or $CO_2/CO$ using a carbon/graphite anode. Those teachings do not consider reduced or suboxides of titanium which require less electrochemical energy to produce titanium metal than required to reduce $TiO_2$. Thus the reduced oxides of $Ti_2O_3$ or TiO can serve as cathodes and be electrochemically reduced in molten calcium chloride or other molten salt electrolytes.

Heretofore, there has not been an electrochemical system to produce titanium similar to electrowinning aluminum in which alumina ($Al_2O_3$) is soluble in molten cryolite ($NaAlF_4$) which under electrolysis produces aluminum metal with $CO_2/CO$ being given off at a carbon anode, because there has not been identified a molten salt composition that will dissolve $TiO_2$. There is no known molten salt compound or combination of compounds that will dissolve $TiO_2$. However, there are molten salt compositions that will dissolve the reduced suboxide TiO which is an ionic compound that is very electrically conductive. For example TiO is soluble in molten calcium chloride mixed alkali and alkaline earth chlorides as well as fluorides or mixed chlorides and fluorides. Thus TiO can be dissolved in $CaCl_2$ or other salt mixture, and using a carbon/graphite anode electrolyzed to produce titanium at the cathode and $CO_2$/CO at the anode or oxygen using an inert anode. Since titanium is sensitive to oxygen a separator or diaphragm should be used between the anode and cathode.

It is well known that the higher the temperature of a solvent the greater the solubility of the solute. In this case the higher the molten salt temperature the greater the solubility of a titanium suboxide such as TiO or $Ti_2O_3$. In the previous discussions the operating salt temperatures are below that of the melting point of titanium and thus titanium is deposited as a solid in a particulate morphology. As in the case of electrowinning aluminum in which aluminum oxide is soluble in cryolite at over 900° C., the aluminum is in a molten state and thus more easily separated from the molten salt/cryolite. In order to achieve the same advantage with titanium, the molten salt operating temperature should be above the melting point of titanium or about 1670° C. Molten salts that have high melting temperatures that will not readily vaporize at 1670° C. or slightly above include calcium fluoride ($CaF_2$) 1360° C., and barium fluoride $BaF_2$ 1280° C. It was found the titanium suboxides and particularly TiO is quite soluble in $CaF_2$ at temperatures above 1670° C. Thus titanium is readily electrowon from its suboxides dissolved in $CaF_2$ or other salts above 1670° C. using a carbon/graphite anode that produces CO and $CO_2$ on electrolysis or an oxygen stable anode that produces oxygen on electrolysis. The titanium produced above 1670° C. is in a molten state and thus readily separatable from the molten salt whose density is less than 3.0 g/cc at the operating temperature and titanium is approximately 4.0 g/cc at the operating temperature thus causing the titanium to sink for easy separation.

Figure 1:
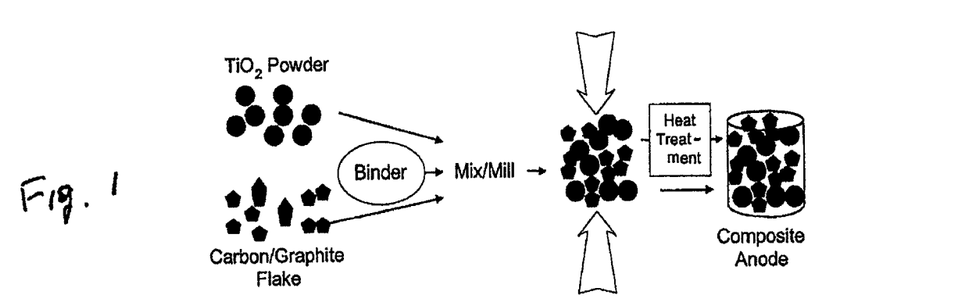
FIG. 1 is a diagrammatic illustration schematically illustrating an electrochemical reaction according to the present invention.

Referring to FIG. 1, there is illustrated schematically the formation of a metal oxide-carbon composite anode in accordance with the present invention. Titanium oxide in a particle size of 0.001-1000 microns, preferably 0.01-500 microns, more preferably 0.1 to 10 microns, is mixed with carbon flakes of average particle size 0.001-1000 microns, preferably 0.01-100 microns, more preferably 0.01 to 1 microns, in a weight ratio of $TiO_2$ to carbon of 7:1 to 4:1 using a ball mill mixer. The $TiO_2$ powder and carbon flakes were mixed dry, or optionally with a binder, in a ball mill mixer for 4-24 hours. The resulting $TiO_2$ powder/carbon flake mix was pressed in a steel die to form a mechanically stable green electrode or billet. The billet was then placed in an oven, and heated in the absence of air to 1000 to 2200° C., preferably about 1100° C. to 1800° C., for 0.1 to 100 hours, preferably about two hours, to form a titanium suboxide/carbon composite electrode.

Figure 2A:
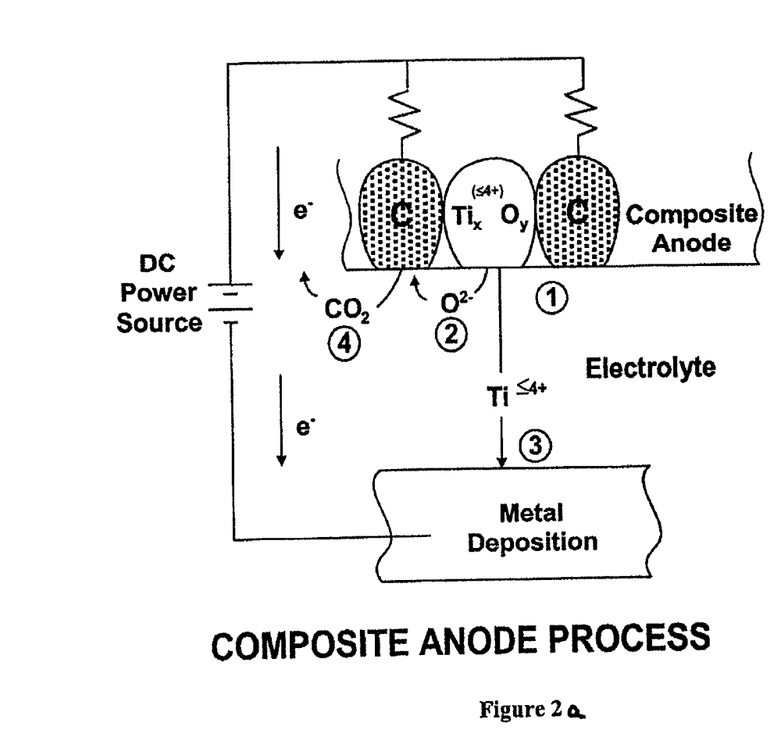
FIG. 2a is a diagrammatic illustration of electrochemical process of the present invention.
Figure 2B:
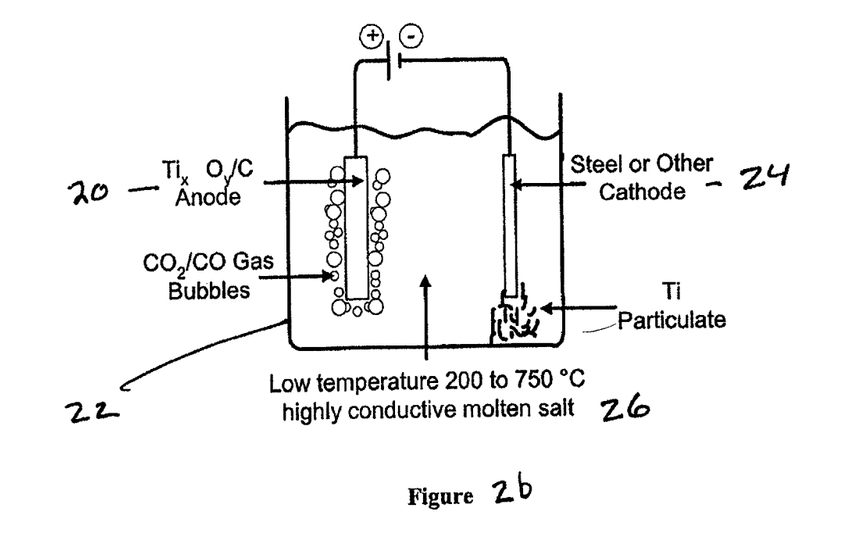
FIG. 2b is a diagrammatic illustration of an electrochemical cell and process in accordance with the present invention.

Referring to FIGS. 2a and 2b, the titanium oxide/carbon composite electrode 20 made as above described is employed as an anode in an electrochemical cell 22 with a conventional metallic, e.g., steel electrode 24, and an alkali metal molten salt electrolyte 26.

The composition of the molten salt electrolyte 26 used in the cell 22 has an effect on the titanium produced at the cathode. The electrolyte should comprise a strong Lewis acid formulation such as $NaAlCl_4$, which melts as low as 150° C., optionally containing fluoride additions such as an alkali fluoride and/or potassium titanium fluoride with the reduced state $Ti_xO_y$—C anode. Other useful electrolyte compositions include binary, tertiary, and quarterary alkali and alkaline earth chlorides, fluorides and mixed chloride-fluorides with melting point temperatures in the 300-900° C. range. For producing titanium preferred electrolytes include NaCl—$CaCl_2$—KCl in a mole ratio of 50:50:20; NaCl—LiCl—KCl in a mole ratio of 20:60:40; $AlCl_3$—NaCl—NaF in a mole ratio of 70:30:20 L:Cl—KCl eutectic with 20 wt % NaF, eutectic of LiF—KF, etc. Moreover, the polarizing strength of the cation will directly affect the electroreduction of electrocrystallization to titanium. And, the small highly ionic strength and steric effect of e.g., a lithium ion in the electrolyte enhances the polarizing strength at the cathode and thus the electroreduction of titanium. Other such highly ionic ions can aid in stabilizing the $Ti^{+3}$ and/or $Ti^{+2}$ ions in the molten salt electrolyte as well as their electroreduction at the cathode.

To avoid disproportionation during the electrolysis between titanium in the metallic state, that is electrowon titanium, and higher titanium ions such as $Ti^{+3}$, it is preferable to have only $Ti^{+2}$ ions in solution which as they are reduced to the metal are replaced with other $Ti^{+2}$ ions from the anode thus requiring TiO in the anode. Thus desirably the fused salt initially contains $Ti^{+2}$ ions which desirably is in the concentration range of ½ to 20%, more desirably in range of 1 to 10% and most desirably in the range of 2 to 8%.

The anion also can have an influence on the steric and solvent effect of the titanium species, which also influences the titanium deposit at the cathode. For example, the Ti—F bond is stronger than the Ti—Cl bond, which brings about an increase in the activity of the titanium ions in the molten salt electrolyte and consequently the morphology of the titanium deposited at the cathode. The anion and the titanium ion complex effects the number of crystallization centers available on the cathode and thus the morphology of the titanium cathode deposit. The complex $TiF_6^{-3}$ and the $TiF_6^{-2}$ anion is known and can be directly reduced to titanium. Mixed anions are also known, such as $TiF_{6-N}Cl_N^{-3}$. A strong Lewis acid thus stabilizes and increases the activity of the titanium ion. While not wishing to be bound by theory, it is believed that the reactions proceed as follows:

$$TiF_6^{-3} + 3e = Ti^0 + 6F^-$$

and at the anode $Ti^{+3}$ ions are released from the composite anode to produce the $TiF_6^{-3}$. Thus titanium is directly reduced from the +3 valence to the metal. Because titanium is multivalent it is also possible that $Ti^{+3}$ is reduced to $Ti^{+2}$ and then to the metal $Ti^0$. However, as stated above, if all titanium ions in solution are in the +2 valence then the reduction is $Ti^{+2} + 2e = Ti^0$.

Based on this analysis alkali fluorides may be regarded as stabilizing agents in chloride molten salt electrolytes. Thus the ratio of F/Cl and/or Ti/F will have an effect on the electroreduction of titanium. Indeed it has been demonstrated that all chloride molten salt electrolytes produce small and/or dendritic deposits of titanium. As fluorides are added to the molten salt electrolyte the morphology of the deposit changes to larger and coherent particulate deposits. As the electrolyte changes to primarily or all fluoride, the titanium deposits become flaky to a fully adherent film. The major morphology change begins at a F/Cl ratio of approximately 0.1 and solid films become possible at a ratio of approximately 1.0.

The morphology and size of the titanium deposit is also influenced by the current density of the cathode. The higher the current density the smaller the particle size. Typical cathode current densities are in the 0.05 to 5 amperes/$cm^2$ range. The more desirable cathode current densities are in the 0.1 to 2.0 amperes/cm$^2$ range, and the preferred cathode current densities are in the 0.25 to 1 amperes/cm$^2$ range, depending on the morphology of the titanium desired at the cathode. It also has been found that very high current densities can be used at the cathode under high mass flow of the electrolyte and the use of the composite anode. By moving the electrolyte over the cathode surface via gas bubbling or pumping at a fast rate it is possible to electrolytically produce titanium particularate up to cathode current densities of 125 amps/cm$^2$.

It also has been found that pulsing the current affects the morphology, particle size and cathodic efficiency. The current can be pulsed to on and off sequences in various wave forms such as square, sinusoidal, etc. as well as periodically alternating the polarity. It was found pulsing the current produced more coherent deposits and larger particles as well as solid films on the cathode. It was also found periodically reversing the polarity between two composite electrodes produced titanium within the electrode. That is the $Ti_xO_y$ in the electrode was reduced to titanium, which remained as a solid agglomerate of titanium particles in the same form of the original composite electrode.

Figure 3:
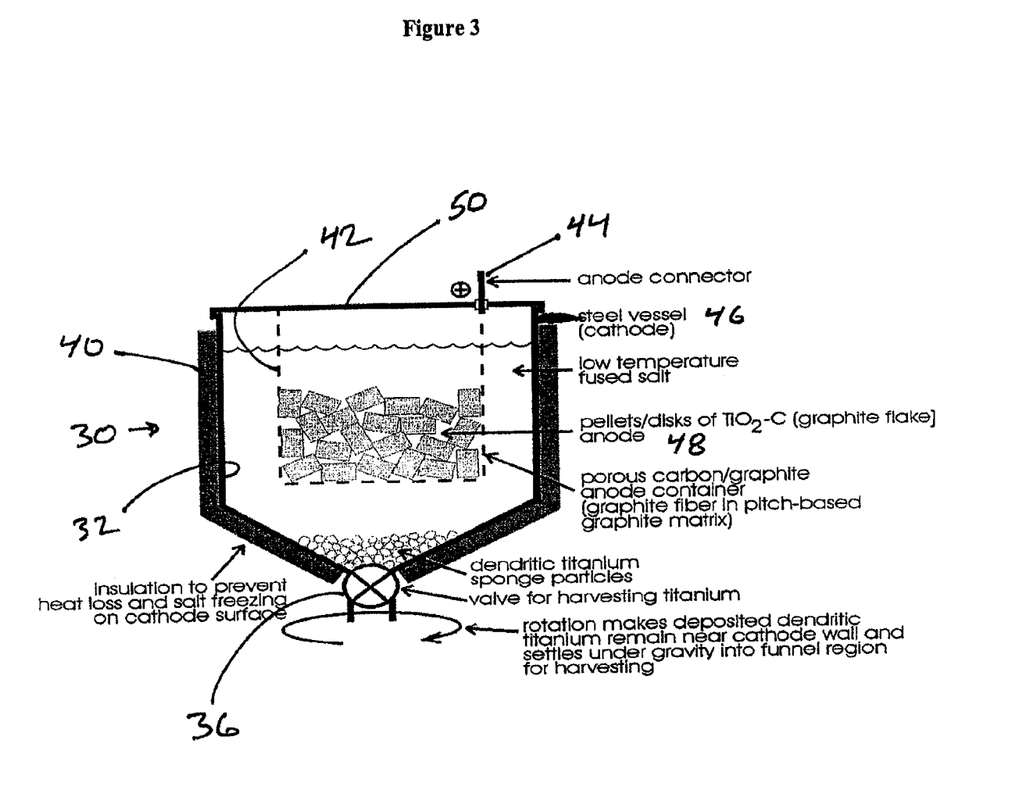
FIG. 3 is a view similar to FIG. 2b providing further details of an electrochemical cell in accordance with the present invention.

A bench scale electrolytic cell for producing titanium in accordance with the present invention is illustrated in FIG. 3. The cell 30 comprises a cylindrically shaped steel walled vessel 32 having a funnel-shaped bottom closed by a valve 36. The vessel walls 32 are wrapped in a resistance heater (not shown) which in turn is covered by thermal insulation 40. A porous basket 42 formed of carbon fiber mesh is suspended within container 30 and is connected via an anode connector 44 to the plus side of the DC current source. Wall 32 of the steel vessel is connected via a conductor 46 to the negative side of a DC current source. Basket 42 is loaded with pellets or discs 48 of titanium suboxide-carbon flake anode material made as above described. The cell is filled with a molten salt electrode (60:LiCl-40KCl), the cell is sealed with a top 50, swept with argon purge to remove air, and a voltage of 3.0V applied which resulted in precipitation of dendritic titanium sponge particles. The titanium sponge particles were then removed via valve 36, separated from the electrolyte, and found to have a purity of 99.9%.

It is possible to deposit other metals similarly. For example, by using a composite anode which includes other metal oxides in addition to the $Ti_xO_y$, it is possible to produce an alloy of titanium. For example, an alloy of Ti—Al—V can be produced by mixing aluminum oxide, vanadium oxide and $TiO_2$ with carbon to form the anode whereby to produce alloy particulate or solid films of Ti—Al—V. The $E_0$ and current density should be adjusted to deposit precise composition alloy particles. Other metals or alloys can be produced by incorporating other metal oxides in the anode in accordance with the present invention.

Figure 4:
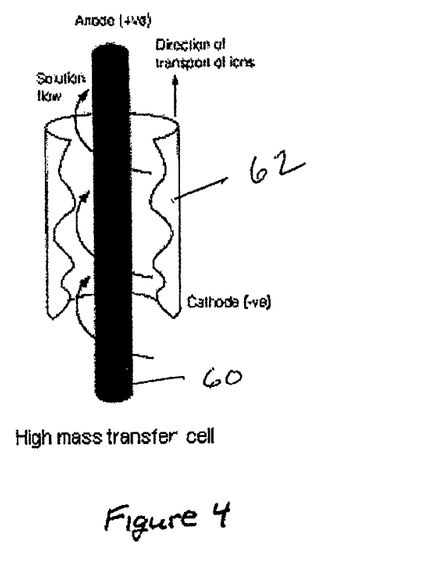
FIG. 4 is a perspective view showing details of an electrode in accordance with the present invention.

From a practical commercial standpoint of producing titanium particulate in which the particulate can be used directly in powdered metallurgical fabrication or consolidated into billets for subsequent rolling into sheet, forging, etc. it is desirable to produce the particulate at as low a cost as possible. High mass transfer and high current density that produces particle sizes that are desirable for commercial applications can be achieved in a cell configuration such as shown in FIG. 4.

In this case the anode container can be a porous carbon-carbon or other anodic container in which $Ti_xO_y$—C anode segments 60 are placed, and the structural container can be the cathode and/or a cathode 62 placed inside the structural container (not shown). Preferably the container is insulated to maintain heat in the molten salt electrolyte to achieve thermal neutrality with the IR/joule heating of the electrolyte at high current densities. Also if desired the molten salt electrolyte could be pumped through cyclone systems and filters to continuously collect the titanium particulate as it is being produced. Commercial pumping systems are readily available to handle pumping molten salt electrolytes such as used in the aluminum and mass soldering industries to pump molten metals. Molten salt electrolytes that are desirable for high mass transfer cell designs of which FIG. 4 is just one example, include strong Lewis acid compositions such as $NaAlCl_4$ and fluoride compositions, and fluoride or chloride alkali and alkaline earth metal salts and mixtures thereof. Utilizing a high mass transfer cell design in which the molten salt electrolyte is pumped over the cathode surface, with high stirring rates and/or ultrasonics to agitate the molten salt electrolyte or the cathode itself coupled with a reduced valence $Ti_xO_y$—C anode permits production of titanium particulate at a relatively high rate and relatively low cost. And current pulsing as well as periodic reversing the current can further enhance the production of titanium particulates when coupled with a high mass transfer rate cell as above described.

Heretofore aluminum and magnesium have been produced by a composite anode process utilizing anodes of $Al_2O_3$—C or MgO-C [23-26]. However, there is no teaching or suggestion in any of the prior art that recognizes that high valence (4 or more) or multi-valence metals could be produced by a composite anode process. More importantly, it was not recognized that high value high valence or multi-valence metals such as titanium, chromium, hafnium, molybdenum, niobium, tantalum, tungsten, vanadium, and zirconium could be produced utilizing a composite anode, as in the present invention. Neither was it recognized that a high valence metal oxide could be thermally reduced to a lower valence state in a composite anode or that a reduced valence state metal oxide-carbon anode could be used to produce particulate metal by electroreduction.

In contrast to producing a molten metal aluminum (melting point approx. at 660° C.) and magnesium (melting point approx. at 650° C.), the present invention permits control of particle geometry and size, and grain size in the particle can be controlled by the molten salt composition, its operating temperature and the cathode current density. Moreover, the instant invention permits direct production of metals in the powdered/particulate solid state, unlike the prior art processes which produced molten aluminum [23, 25, 26] or magnesium [24].

In addition, the combination of thermal treatment to reduce the metal to a lower valence state, the use of carbon in the anode to release a lower valence state metal into the molten salt, and the selection of molten salt to stabilize the lower valence state metal so as to produce a fully reduced metal at the cathode, is a unique and advantageous feature of the current invention.

An alternative to reducing the titanium valence in the molten salt is to depolarize the cathode using hydrogen which could not only prevent the re-oxidation of the lower valence titanium at the anode and reduce the total cell voltage, but also allow for the formation of titanium hydrides at the cathodes. Titanium hydride is much more stable than titanium toward oxidation. The present invention thus permits the production of very low oxygen titanium.

Figure 5:
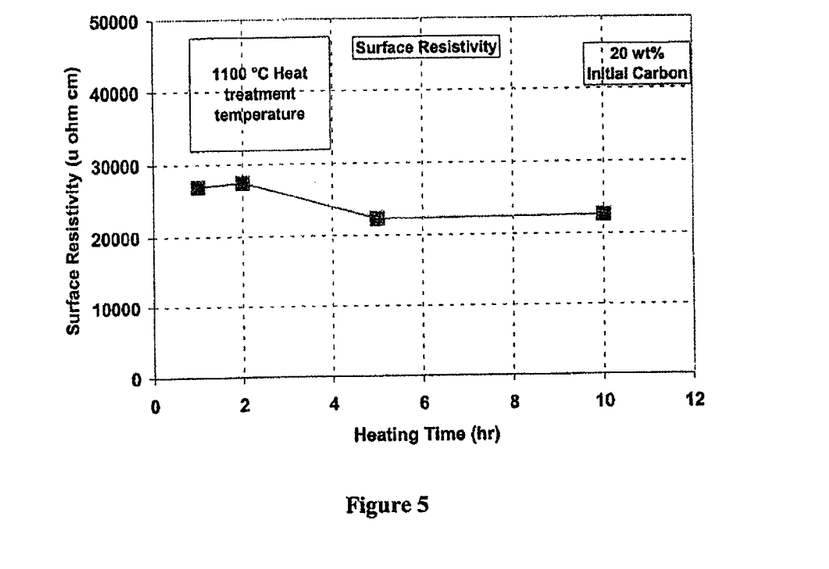
FIG. 5 is a graph illustrating surface resistivity of a titanium oxide carbon anode over time.

Moreover, the present invention overcomes a problem of poor electrical conductivity of the metal oxide-carbon anode of my previous composite anode process [23-26] which required the use of aluminum or magnesium metal conductors through the composite anode to carry current and prevent high voltage drops due to the poor electrical conductivity of the $Al_2O_3$—C or MgO—C composite anodes. In the instant invention, poor anode electrical conductivity is overcome by using highly electrically conductive carbon flake as the major carbon source in the composite anode. Small size composite anode pieces can also be utilized to reduce voltage drop as illustrated in FIG. 3 as contrasted to large size anodes which can result in high resistivity and larger voltage drops that increase energy consumption. Examples of low resistivity in a reduced valence state titanium oxide carbon anode is shown in FIG. 5. Further when the $TiO_2$ is reduced to TiO, the TiO is very electrically conductive, more so than graphite. Thus anodes made with TiO are quite conductive and in one iteration does not require pressing into a composite with graphite flake or other carbon forms. The TiO is so conductive, it can be simply mixed with carbon/graphite in a basket that serves as the anode with a conductor which can be the basket or a graphite rod.

The following non-limiting Examples will further demonstrate the present invention.

EXAMPLE 1

Titanium dioxide ($TiO_2$) with a purity of 99% in a particle size of 0.3 microns was mixed with graphite flake in a particle size of 40 microns in a ratio of 80 grams of $TiO_2$ and 20 grams of graphite flake using a ball mill mixer. The resulting $TiO_2$-graphite flake mixture was pressed in a steel die at 50,000 psi, which provided a mechanically stable billet without any binder system. The $TiO_2$-graphite flake billet was heated to 1100° C. in the absence of air for two hours. An XRD analysis showed the resulting composite anode to consist of $Ti_2O_3$, $Ti_3O_5$ and $Ti_4O_7$ and graphite. The resulting titanium oxide-graphite composite anode was cut into one inch (2.54 cm) long segments, and the segments placed in a carbon-carbon composite basket as illustrated in FIG. 3 which had residual porosity that served as a membrane and to which the positive terminal of a dc power supply was connected. A steel walled container (illustrated in FIG. 3) was used to melt an electrolyte consisting of NaCl—$CaCl_2$—KCl eutectic at a temperature of 650° C. The steel walled container was connected to the negative terminal of the dc power supply. The steel walled container was covered, sealed and swept with an argon purge to remove any air from the system. Electrolysis was conducted at an anode and cathode current density of 0.5 amps/$cm^2$, which produced titanium particulate at the steel cathode. The titanium particulate was harvested with a screen scoop and then subjected to 1200° C. in a vacuum to remove all traces of the electrolyte. The particle size was in the range of one to ten microns with a predominance of 5-10 microns. The titanium powder was analyzed for oxygen and found to have 800 parts per million. The current efficiency was measured by calculating the amphere hours passed and weighing the titanium produced which was found to be 95% at the cathode and 99% at the anode.

EXAMPLE 2

A mixture of $TiO_2$ and graphite flake was mixed as described in Example 1 and a resin binder of phenolic was used to bind the particles in the pressing operation. The pressed body was then heated in an inert atmosphere to 1300° C., which produced a well-bonded strong composite anode consisting of a mixture of $Ti_2O_3$ with some $Ti_3O_5$ and a small amount of TiC along with graphite. Electrolysis was conducted as in Example 1 at a cathode current density of 1.0 amp/$cm^2$. Titanium powder was produced at an efficiency of 90% in an average particle size of 10 microns.

EXAMPLE 3

Example 2 was repeated with electrolysis at a cathode current density of 0.25 amps/$cm^2$ which produced an efficiency of 97% with a particle size of approximately 20 microns.

EXAMPLE 4

A composite anode was produced using a mixture of $TiO_2$, $Al_2O_3$ and $V_2O_3$ in an elemental ratio of Ti-6Al-4V. A stoichiometric ratio of graphite flake was mixed with the oxides and a coal tar pitch binder was used. The molded composite anode was heat treated to 1200° C. in an inert atmosphere. The composite anode was placed in the anode basket as described in Example 1 but a sheet of titanium was used as the cathode. The electrolyte consisted of NaCl—LiCl—KCl eutetic with 20 mole % LiF. Electrolysis was conducted at a cathode current density of 1.25 amps/$cm^2$, which produced particles in a size primarily in the range of 10-80 microns. The harvested particles were analyzed and found to contain a ratio of Ti-6Al-4V.

EXAMPLE 5

A composite anode was prepared as described in Example 1 and heat treated to 1150° C. The molten salt electrolyte consisted of KF—NaF—LiF eutectic operated at 650° C. The cathode was nickel metal with electrolysis conducted at a cathode current density of 0.25 amps/$cm^2$. A coherent film of titanium 10 microns thick was deposited on the nickel cathode.

EXAMPLE 6

A composite anode was produced as described in Example 2 using $Y_2O_3$ and graphite flake in stoichiometric ratio. The anode was electrolyzed as in Example 2, which produced yttrium metal in a particle size of 10-30 microns.

EXAMPLE 7

A composite anode was produced as described in Example 2 using stoichiometric ratio of $HfO_2$ and carbon. Electrolysis of the anode in a molten salt electrolyte, as in Example 4, at a cathode current density of 0.5 ampheres/$cm^2$ produced metal hafnium metal particularate having a particle size of 10-100 microns.

EXAMPLE 8

A composite anode was produced by mixing a stoichiometric amount of $Cr_2O_3$—C and a pitch binder. The composite anode was heated in the absence of air to 1400° C. and then electrolyzed at a cathode current density of 0.25 amps/$cm^2$ in a molten salt electrolyte as in Example 4. A chromium particulate was produced having a particle size of 5-40 microns.

EXAMPLE 9

Rutile ore which contained approximately 95% $TiO_2$ was dried and mixed with graphite flake and a resin binder to produce the oxide-carbon in stoichiometric ratio. The mixture was compressed to 20,000 psi and heat treated in an inert atmosphere to 1200° C. The anode was electrolyzed as in Example 4, which produced a powder at the cathode containing primarily titanium, and small amounts of iron, aluminum, niobium, vanadium and silicon having a particle size of 1-80 microns.

EXAMPLE 10

A salt composition of (65 $AlCl_3$-35 NaCl mole %) −20 mole % NaF was utilized as the electrolyte at an operating temperature of 190° C. A composite anode was utilized as described in Example 1 with electrolysis conducted with a pulsed current 3 seconds on and 1 second off. A crystalline titanium deposit of flake morphology was produced at a cathode current density of 1 amps/$cm^2$.

EXAMPLE 11

Example 10 was repeated with a cathode current density of 0.25 amps/$cm^2$. The resulting titanium deposit was a solid film on the cathode. The pulse scheme was then modified to 3 seconds on ¼ second off with periodic reverse polarity and then repeating the cycle. The deposit was a solid film with a very fine grain microstructure. Other shape form pulses provided similar results.

EXAMPLE 12

Hydrogen was used at the cathode in an electrolytic cell similar to Example 10 with or without a pulsed current. Cell voltage was decreased by about 10 to 15%, and titanium hydride powder formed in-situ in the cell instead of metallic titanium powder. Washing the titanium hydride produced oxygen pick up of ≤200 ppm. The resulting titanium hydride was then dehydrogenated by heating to about 650° C. to produce metallic titanium powder with ≤400 ppm oxygen. This oxygen level is an order of magnitude lower than titanium powder produced by any other process.

EXAMPLE 13

Titanium oxide was mixed with a stoichiometric amount of carbon black and heated under a reduced pressure of 0.01 atmosphere in argon to a temperature of 1450° C. which produced the titanium suboxide of $Ti_2O_3$ with no other suboxides or contaminates such as TiC. The $Ti_2O_3$ was mixed with graphite flake, a binder of phenobic resin, and pressed into a block. The block was heated in the absence of air to 1100° C. which formed an anode. The resulting composite anode was used in a fused salt consisting of the eutectic of LiCl—KCl operated at 500° C. Electrolysis was conducted in trial one at 1 amp/$cm^2$ on the cathode which produced titanium particularate in a size of 1 to 10 microns. In a second trial a titanium sponge was placed in the bottom of the fused salt and $TiCl_4$ was bubbled onto the sponge which produced $TiCl_2$ in the salt bath. $TiCl_4$ continued until a concentration of 5% $TiCl_2$ was generated. Electrolysis was then performed as in trial one and titanium particularate with a size up to 400 microns was produced, thus showing with a titanium ion in solution larger size titanium particularate was produced.

EXAMPLE 14

An identical system as in Example 13 was created before and $TiCl_2$ was generated, and in trial one, the electrolysis was performed at 40 amps/$cm^2$. The titanium particularate produced was in a size range of 20 to 100 microns. In trial two electrolysis was performed at 125 amps/$cm^2$ which produced titanium particles in approximately the same size as the 40 amps/$cm^2$ current density trial. In trial three electrolysis was also performed at 125 amps/$cm^2$ with argon gas bubbling over the cathode to create a large mass flow. The titanium particularate produced in the high mass flow at 125 amps/$cm^2$ was in the size range of 40 to 200 microns. The titanium suboxide-carbon composite anode provides the opportunity to operate at very high cathode current densities and in a high mass flow regime.

EXAMPLE 15

$TiO_2$ and carbon were heated under a pressure of 0.01 residual argon atmosphere to 1850° C. which produced TiO and CO. The TiO was mixed with stoichrometric carbon and a binder and molded into a block which was heated to 1100° C. which formed a composite anode. The resulting composite anode was placed in a salt mixture of 60NaCl-40$MgCl_2$ and 20 mole percent NaF based on the chloride salt mixture operated at 600° C. In trial one, the electrolysis was performed at 0.15 amps/$cm^2$ and titanium particularate in the size range of 50 to 300 microns was produced. In trial two, a titanium sponge was placed in a small crucible immersed in the salt bath and $TiCl_4$ was bubbled onto the sponge that produced $TiCl_2$ until the concentration was 8% $TiCl_2$ in the salt. Electrolysis was performed at 0.15 amps/$cm^2$ which produced titanium particularate in the 200 to 500 micron size. The oxygen content was 380 parts per million.

EXAMPLE 16

Rutile with a composition as follows, and the remainder titanium was processed as shown in the headings:

| Impurities | Units | As received composition | After heating to 1700° C. with carbon | Purity of Electrolytically produced titanium |
|---|---|---|---|---|
| Al | ppm | 5300 | 4200 | 700 |
| Ca | ppm | 570 | 530 | <100 |
| Cr | ppm | 300 | 150 | 100 |
| Fe | ppm | 4390 | 140 | 100 |
| Mg | ppm | 1470 | 1270 | 500 |
| Si | ppm | 12000 | <100 | <100 |
| V | ppm | 2290 | 2290 | 2000 |
| Zr | ppm | 360 | 250 | 300 |

With the remainder titanium

The rutile was mixed with carbon in a ratio of 1.1 to stoichiometry and heated to 1700° C. in argon at atmospheric pressure. The composition after heating is shown in the second column which shows the rutile was purified and particularly in the case of iron and silicon of which the latter is most undesirable as an impurity in titanium metal.

The purified rutile was mixed with carbon and resin and molded onto a block which was heat treated to 1250° C. The composite block was utilized as an anode in a salt bath of NaCl—$CaCl_2$ operated at 650° C. Electrolysis was performed at 0.5 amps/$cm^2$ which produced particularate in the size range of 50-350 microns with a purity as shown in column five above. Aluminum and vanadium are desirable alloying elements for titanium and are used in most titanium alloys. Thus a relatively pure titanium is produced from low cost domestic source rutile which can meet virtually all market demands except the stringent aerospace requirements.

EXAMPLE 17

$TiO_2$ was mixed with carbon and heated in a 90% nitrogen 10% hydrogen atmosphere to 1600° C. which produced titanium nitride (TiN). The TiN was pressed and sintered at 2000° C. in a nitrogen atmosphere. The TiN block was used as an anode in a salt mixture of (NaCl—KCl)-20 mole % NaF operated at 700° C. Electrolysis was conducted at 0.5 amps/cm$^2$ which produced titanium particularate in the size range of 20 to 350 microns and nitrogen gas was given off at the anode.

EXAMPLE 18

$TiO_2$ was mixed with carbon in a ratio of 1 to 1.5 over stoichiometry and heated in argon at 1600° C. which produced titanium carbide (TiC). The TiC was pressed and sintered at 2000° C. The TiC was used as an anode in the same salt as in Example 17. During electrolysis at 1 amp/cm$^2$ oxygen was bubbled under the TiC anode in an amount equivalent to the current to produce titanium so that the oxygen reacted with the freed carbon to produce $CO_2$/CO which is often referred to as depolarizing the electrode. A diaphragm of porous alumina was placed between the anode and cathode to prevent any oxygen from contacting the deposited titanium particularate and oxidizing it. The particle size of titanium particularate produced was in the size range of 20 to 200 microns.

EXAMPLE 19

The suboxide TiO was produced by reacting $TiO_2$ with stoichiometric carbon in a vacuum of 0.01 atmosphere at a temperature of 1850° C. The TiO was then pressed and practically sintered at 1450° C. to provide a porous body which served as a cathode in a fused salt bath of calcium chloride containing 5% calcium oxide operated at 900° C. A graphite anode was utilized and electrolysis performed at a constant voltage of 3.0V for a period of 12 hours. The TiO was reduced to titanium metal with oxygen being attracted to the anode to produce $CO_2$/CO.

EXAMPLE 20

Example 19 was repeated using $Ti_2O_3$ as the starting material.

EXAMPLE 21

Example 19 was repeated with the exception the electrolyte was the eutectic of $CaCl_2$—NaCl which was operated at 750° C. With the suboxide TiO, the lower temperature salt bath can be used to reduce TiO to titanium metal.

EXAMPLE 22

The molten salt bath electrolyte of $CaCl_2$ operated at 900° C. showed a considerable solubility of the reduced suboxide of titanium TiO. In a salt bath operated at 900° C. 5 wt % TiO was added and electrolysis conducted with a carbon anode. Titanium particularate was deposited on the cathode at a current density of 1 amp/cm$^2$. In a second trial, a porous alumina diaphragm was used around the anode to prevent any oxygen from diffusing to the deposited titanium on the cathode and contaminating the deposited titanium particularate.

EXAMPLE 23

A molten salt composition consisting of the $CaCl_2$—NaCl eutectic containing 20 mole % NaF was operated at 750° C. and 2 wt % TiO was added which became soluble in the salt bath. A carbon anode was used and electrolysis performed at a cathode current density of 0.25 amps/cm$^2$. Titanium particularate was deposited on the cathode and $CO_2$/CO was evolved from the carbon anode.

EXAMPLE 24

TiO was produced as described in Example 15 and mixed with carbon particularate. The mixture of TiO-C was placed in a porous carbon-carbon basket which served as the anode electrical conductor. The anode basket containing TiO—C was placed in a salt of LiCl—KCl eutectic containing 20 wt % NaF operated at 680° C. Electrolysis was performed at 1 amps/cm$^2$ which produced titanium particularate in the size range of 50-500 microns which demonstrated a physical mixture of TiO—C can serve as an anode.

EXAMPLE 25

An anode produced as described in Example 13 was utilized in the electrolyte given in Example 13 with electrolysis conducted at 1 amps/cm$^2$ concurrent with hydrogen bubbling under the cathode. The deposit was titanium particularate in the size range of 50-800 microns. Heating the deposit showed hydrogen evolution as detected in a mass spectrometer.

EXAMPLE 26

A graphite crucible was set inside a steel cell with a cover and seal to provide an inert atmosphere with an argon purge. A graphite rod with a reduced tip to serve as a resistor was placed through a standard feed-through in the cell cover. Calcium fluoride was placed in the graphite crucible. The graphite rod was heated resistively between a connection to it and the steel cell which raised the temperature to 1700° C. which melted the calcium fluoride. TiO was then added at 5 wt %. Electrolysis was conducted at 1 amps/cm$^2$ between a separate graphite anode and the crucible serving as the cathode. After six hours of electrolysis the experiment was stopped and the system cooled. Breaking the salt revealed beads of titanium that had been produced in the molten salt.

The above embodiments and examples are given to illustrate the scope and spirit of the instant invention. These embodiments and examples are within the contemplation of the present invention. Therefore, the present invention should be limited only by the appended claims.

The invention claimed is:

1. A method for the production of a substantially pure metal alloy of interest which comprises thermally reducing two or more metals of interest at an anode in a molten salt electrolyte, the anode being formed of a composite of two or more oxides of the two or more metals and carbon, wherein sufficient carbon is present to stoichiometrically react with the reduced metals in the metal oxides to produce the substantially pure metal alloy at a metallic cathode and electrochemically form $CO_2$ and/or CO at the anode without the formation of a metal carbide.

2. The method of claim 1, wherein the anode is a composite formed of carbon and two or more metal oxides selected from the group consisting of titanium oxide, titanium suboxide, chromium oxide, hafnium oxide, molybdenum oxide, niobium oxide, tantalum oxide, tungsten oxide, vanadium oxide and zirconium oxide.

3. The method of claim 1, wherein said molten salt electrolyte comprises a strong Lewis acid.

4. The method of claim 3, wherein the electrolyte is selected from the group consisting of an eutectic of sodium chloride, lithium chloride and potassium chloride, an eutectic of potassium fluoride, sodium fluoride and lithium fluoride, an eutectic of sodium chloride, calcium chloride and potassium chloride, an eutectic of sodium chloride, magnesium chloride and sodium fluoride, and an eutectic of sodium chloride, potassium chloride and sodium fluoride.

5. The method of claim 1, wherein an electric current is applied in a pulsed manner.

6. The method of claim 1, wherein an electric current is in a pulsed, periodically reversed polarity.

7. A method for the direct production of a metal alloy of interest in a particulate state which comprises subjecting an anode, formed of a composite of oxides of two or more metals of interest and carbon, to thermal reduction and electrolysis in a cell containing a molten salt electrolyte and a metallic cathode, wherein sufficient carbon is present to stoichiometrically react with the thermally reduced metal oxides to produce a substantially pure metal alloy of interest at the cathode, and electrochemically form $CO_2$ and/or CO at the anode without the formation of a metal carbide.

8. The method of claim 7, wherein the anode is a composite formed of and two or more metal oxides selected from the group consisting of titanium oxide, titanium suboxide, chromium oxide, hafnium oxide, molybdenum oxide, niobium oxide, tantalum oxide, tungsten oxide, vanadium oxide and zirconium oxide.

9. The method of claim 7, wherein said molten salt electrolyte comprises a strong Lewis acid.

10. The method of claim 9, wherein the electrolyte is selected from the group consisting of an eutectic of sodium chloride, lithium chloride and potassium chloride, an eutectic of potassium fluoride, sodium fluoride and lithium fluoride, an eutectic of sodium chloride, calcium chloride and potassium chloride, an eutectic of sodium chloride, magnesium chloride and sodium fluoride, and an eutectic of sodium chloride, potassium chloride and sodium fluoride.

11. The method of claim 7, wherein an electric current is applied in a pulsed manner.

12. The method of claim 7, wherein an electric current is in a pulsed, periodically reversed polarity.

13. A method for the production of a substantially pure metal of interest which comprises thermally reducing the metal of interest at an anode formed of a composite of two or more oxides of the metal of interest and carbon in a molten salt electrolyte, wherein the carbon present stoichiometrically reacts with the reduced metal oxides to produce the substantially pure metal of interest at a metallic cathode and $CO_2$ and/or CO at the anode without the formation of a metal carbide, and wherein an electric current is applied in a pulsed manner.

14. The method of claim 13, wherein the anode is a composite formed of carbon and a metal oxide selected from the group consisting of titanium oxide, titanium suboxide, chromium oxide, hafnium oxide, molybdenum oxide, niobium oxide, tantalum oxide, tungsten oxide, vanadium oxide, and zirconium oxide.

15. The method of claim 13, wherein said molten salt electrolyte comprises a strong Lewis acid.

16. The method of claim 15, wherein the electrolyte is selected from the group consisting of an eutectic of sodium chloride, lithium chloride and potassium chloride, an eutectic of potassium fluoride, sodium fluoride and lithium fluoride, an eutectic of sodium chloride, calcium chloride and potassium chloride, an eutectic of sodium chloride, magnesium chloride and sodium fluoride, and an eutectic of sodium chloride, potassium chloride and sodium fluoride.

17. The method of claim 13, wherein an electric current is in a pulsed, periodically reversed polarity.

18. A method for the direct production of a substantially pure metal of interest in a particulate state which comprises subjecting an anode, formed of a composite of two or more oxides of the metal of interest and carbon, to thermal and electrolytic reduction in a cell containing a molten salt electrolyte and a metallic cathode, wherein sufficient carbon is present to stoichiometrically react with the thermally reduced metal oxides to produce the substantially pure metal of interest at the cathode and electrolytically form $CO_2$ and/or CO at the anode without the formation of a metal carbide, and wherein an electric current is applied in a pulsed manner.

19. The method of claim 18, wherein the anode is a composite formed of carbon and a metal oxide selected from the group consisting of titanium oxide and titanium suboxide.

20. The method of claim 18, wherein said molten salt electrolyte comprises a strong Lewis acid.

21. The method of claim 18, wherein the electrolyte is selected from the group consisting of an eutectic of sodium chloride, lithium chloride and potassium chloride, an eutectic of potassium fluoride, sodium fluoride and lithium fluoride, an eutectic of sodium chloride, calcium chloride and potassium chloride, an eutectic of sodium chloride, magnesium chloride and sodium fluoride, and an eutectic of sodium chloride, potassium chloride and sodium fluoride.

* * * * *